(12) United States Patent
Anzai et al.

(10) Patent No.: US 8,000,755 B2
(45) Date of Patent: Aug. 16, 2011

(54) INFORMATION-COMMUNICATION TERMINAL DEVICE AND AUTOMATIC BACKUP SYSTEM INCLUDING THE SAME

(75) Inventors: Jun Anzai, Yokohama (JP); Yasuhide Horiuchi, Yokohama (JP)

(73) Assignee: Panasonic Corporation, Osaka (JP)

( * ) Notice: Subject to any disclaimer, the term of this patent is extended or adjusted under 35 U.S.C. 154(b) by 594 days.

(21) Appl. No.: 12/096,166

(22) PCT Filed: Dec. 9, 2005

(86) PCT No.: PCT/JP2005/022691
§ 371 (c)(1),
(2), (4) Date: Jun. 4, 2008

(87) PCT Pub. No.: WO2007/066412
PCT Pub. Date: Jun. 14, 2007

(65) Prior Publication Data
US 2009/0170569 A1    Jul. 2, 2009

(51) Int. Cl.
*H04B 1/38* (2006.01)
*H04M 1/66* (2006.01)
(52) U.S. Cl. ........................................ 455/573; 455/411
(58) Field of Classification Search .................. None
See application file for complete search history.

(56) References Cited

U.S. PATENT DOCUMENTS

| 6,249,690 B1 * | 6/2001 | Mashiko | 455/573 |
| 2002/0155865 A1 * | 10/2002 | Aoyama | 455/572 |

FOREIGN PATENT DOCUMENTS

| JP | 11-232884 A | | 8/1999 |
| JP | 2000312178 A | * | 11/2000 |
| JP | 2000324237 A | * | 11/2000 |
| JP | 2000-517487 A | | 12/2000 |
| JP | 2001-285451 A | | 10/2001 |
| JP | 2002-033798 A | | 1/2002 |
| JP | 2002-237876 A | | 8/2002 |
| JP | 2003-188954 A | | 7/2003 |
| JP | 2004310387 A | * | 11/2004 |
| JP | 2005-189969 A | | 7/2005 |
| JP | 2005-311552 A | | 11/2005 |

OTHER PUBLICATIONS

English Translation of JP-2000312178 A in PDF format.*
English Translation of JP-2000324237 A in PDF format.*
English Translation of JP-2004310387 A in PDF format.*
International Search Report dated Mar. 14, 2006, issued in corresponding Application No. PCT/JP2005/022691, filed Dec. 9, 2005.

* cited by examiner

*Primary Examiner* — Yuwen Pan
*Assistant Examiner* — Ayodeji Ayotunde
(74) *Attorney, Agent, or Firm* — Seed IP Law Group PLLC

(57) ABSTRACT

An information-communication terminal device maintaining a low cost of a charger in the case of backup for the device at a charging time, having a high performance security at the backup and allowing users to easily handle the security control after the backup. A charger (107) in the information communication terminal device is charged electric power from a charger (3). An access-release demanding section (105) receives ID data from the charger (3) during the charging time, and demands to release access control to an IC-card-function installed memory card (2). After the IC card-function installed memory card (2) releases the access control, a control section (101) carries out the backup or restore to the IC card-function installed memory card (2).

8 Claims, 6 Drawing Sheets

INFORMATION-COMMUNICATION TERMINAL DEVICE AND AUTOMATIC BACKUP SYSTEM INCLUDING THE SAME

TECHNICAL FIELD

The present invention relates to an information communication terminal apparatus that backs up data during charging and an automatic backup system including this apparatus.

BACKGROUND ART

In recent years, with the increasing amount of data handled by users in information communication terminal apparatuses such as mobile telephones, a backup time and power consumption also tend to increase. Furthermore, CPU resources of a mobile telephone are also consumed during backup. In order to cope with these backup-related problems, there are proposals of various conventional methods for automatically carrying out backup during charging when a mobile telephone is not in use for a long time.

For example, Patent Document 1 discloses a method of automatically backing up data of a mobile telephone to a backup memory mounted in a battery charger upon detecting contact with the mobile telephone. However, according to the backup method disclosed in Patent Document 1, when approach or contact of the mobile telephone to/with the battery charger is detected, the backup data is automatically stored in the memory of the battery charger without access restriction, and therefore there is a danger that the backup data may be illegally accessed.

As a technique for solving this problem, a method is known where a user identification number (hereinafter referred to as "ID") is read from an SIM (Subscriber Identity Module) of a mobile telephone and data is backed up in a backup memory mounted in a battery charger when an ID prestored in the battery charger matches the SIM ID (e.g., see Patent Document 2).

Patent Document 1: Japanese Patent Application Laid-Open No. 2001-285451
Patent Document 2: Japanese Patent Application Laid-Open No. 2003-188954

DISCLOSURE OF INVENTION

Problems to be Solved by the Invention

According to the conventional techniques disclosed in both Patent Document 1 and Patent Document 2, data is backed up in the memory on the battery charger side. For this reason, when a user tries to prevent unauthorized access to data and ensure security, it is necessary to manage not only the data in the mobile telephone but also the data backed up in the battery charger which the user usually do not carry, increasing burden on the user for security management.

Furthermore, when the battery charger has a backup memory, the battery charger cost may increase in accordance with an increase in the capacity of backup memory in the future, which may contradict the demand for cost reduction of the battery charger. Furthermore, when backup is performed on the battery charger side, the specification of the battery charger often varies depending on the model of the mobile telephone/and so, if the user replaces the mobile telephone with a new one of different specification, there is a problem that the old battery charger cannot be used.

It is therefore an object of the present invention to provide an information communication terminal apparatus and an automatic backup system including this apparatus that maintain low cost of a battery charger when backup is performed during charging, have high security performance and allow the user to easily manage security also after the backup.

Means for Solving the Problem

The information communication terminal apparatus of the present invention adopts a configuration including: a charging section that charges power supplied from a battery charger; an access restriction cancellation requesting section that requests an information holding member to cancel an access restriction using confidential information transmitted from the battery charger during charging; and a control section that performs backup or restoration between the information holding member and the information communication apparatus after the information holding member cancels the access restriction.

The information holding member of the present invention adopts a configuration including: an access control section that compares prestored or calculated confidential information with the confidential information reported from the information communication terminal apparatus and cancels an access restriction when both pieces of information match; and a control section that performs backup or restoration between the information communication terminal apparatus and the information holding member after the access restriction is canceled.

The battery charger of the present invention adopts a configuration including: a power supply section that supplies power to the information communication terminal apparatus; and a control section that transmits stored or calculated confidential information to the information communication terminal apparatus during the power supply.

The information holding member of the present invention adopts a configuration including: an access control section that compares prestored or calculated confidential information with confidential information reported from a battery charger that supplies power to the information communication terminal apparatus and cancels access restriction when both pieces of information match; and a control section that performs backup or restoration between the information communication terminal apparatus and the information holding member after access restriction is canceled.

The battery charger of the present invention adopts a configuration including. a power supply section that supplies power to an information communication terminal apparatus; and an access restriction cancellation requesting section that requests the information holding member to cancel the access restriction using stored or calculated confidential information during the power supply.

The information communication terminal apparatus of the present invention adopts a configuration including: a charging section that charges power supplied from the battery charger; and a control section that performs backup or restoration between the information holding member and the information communication terminal apparatus after the information holding member cancels access restriction.

The automatic backup system of the present invention is an automatic backup system including: an information communication terminal apparatus; an information holding member that performs backup or restoration between the information communication terminal apparatus and the information holding member; and a battery charger that supplies power to the information communication terminal apparatus, and in the automatic backup system, the battery charger transmits stored or calculated confidential information to the information communication terminal apparatus; the information communication terminal apparatus requests the information holding member to cancel access restriction using the confidential information transmitted from the battery charger; and the information holding member compares prestored or calculated confidential information with the confidential information reported from the information communication terminal apparatus, cancels the access restriction when the two pieces of information match and performs backup or restoration between the information communication terminal apparatus and the information holding member.

The automatic backup system of the present invention is an automatic backup system including: an information communication terminal apparatus; an information holding member that performs backup or restoration between the information communication terminal apparatus and the information holding member; and a battery charger that supplies power to the information communication terminal apparatus, and in the automatic backup system, the battery charger requests the information holding member to cancel an access restriction using stored or calculated confidential information during the power supply; and the information holding member compares prestored or calculated confidential information with the confidential information reported from the information communication terminal apparatus, cancels the access restriction when the two pieces of information match and performs backup or restoration between the information communication terminal apparatus and the information holding member.

ADVANTAGEOUS EFFECT OF THE INVENTION

According to the present invention, it is possible to cancel the access restriction function of the information holding member using ID data stored in the battery charger during charging of the information communication terminal apparatus and perform data backup or the like between the information holding member and the information communication terminal apparatus, so that it is possible to maintain low cost of the battery charger, improve the security performance during backup and allow the user to easily manage security also after the backup.

BEST MODE FOR CARRYING OUT THE INVENTION

Hereinafter, embodiments of the present invention will be explained in detail with reference to the attached drawings.

Embodiment 1

Figure 1:
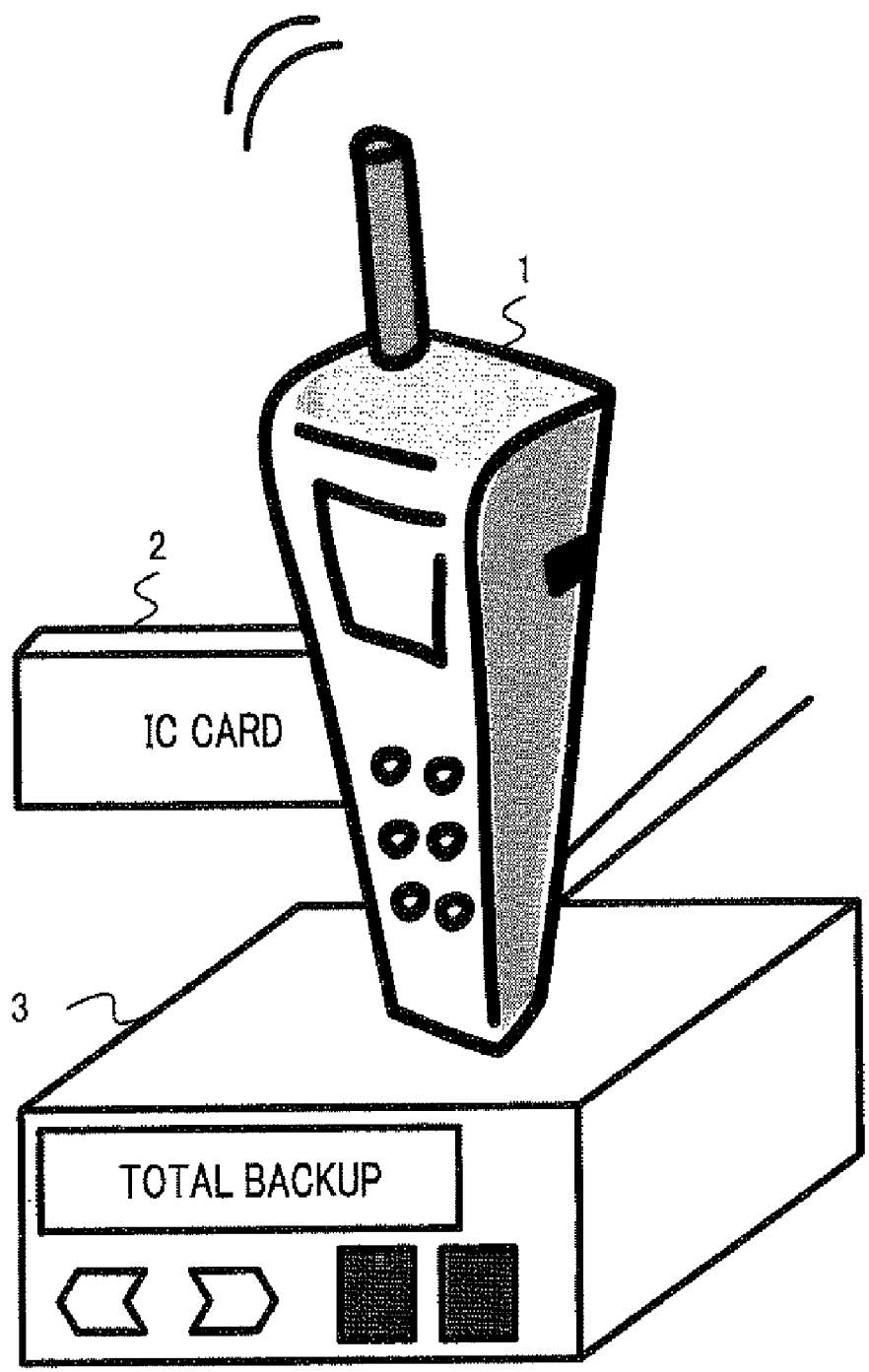
FIG. 1 is a schematic diagram of an automatic backup system according to Embodiment 1 of the present invention.

FIG. 1 is a schematic diagram of an automatic backup System according to Embodiment 1 of the present invention. As shown in FIG. 1, the backup system according to the present embodiment is mainly configured with mobile telephone 1, memory card with an IC card function 2 and battery charger 3. Memory card with an IC card function 2 is accommodated in mobile telephone 1, and FIG. 1 shows an enlarged view of the shape to make an understanding easier. The memory card with an IC card function is a kind of information holding member, and refers to a card that has an embedded semiconductor integrated circuit (IC chip) and has both the function as an IC card capable of access restriction and a memory section that stores large volume data. Large-capacity memory cards with an IC card function are appearing on the market one after another, and their access restriction function is also being enhanced while maintaining upward compatibility, and therefore a memory card with an IC card function is suitable as a backup memory for the automatic backup system of the present embodiment.

Hereinafter, the backup system according to the present embodiment will be explained in detail using FIG. 2 to FIG. 5.

Figure 2:
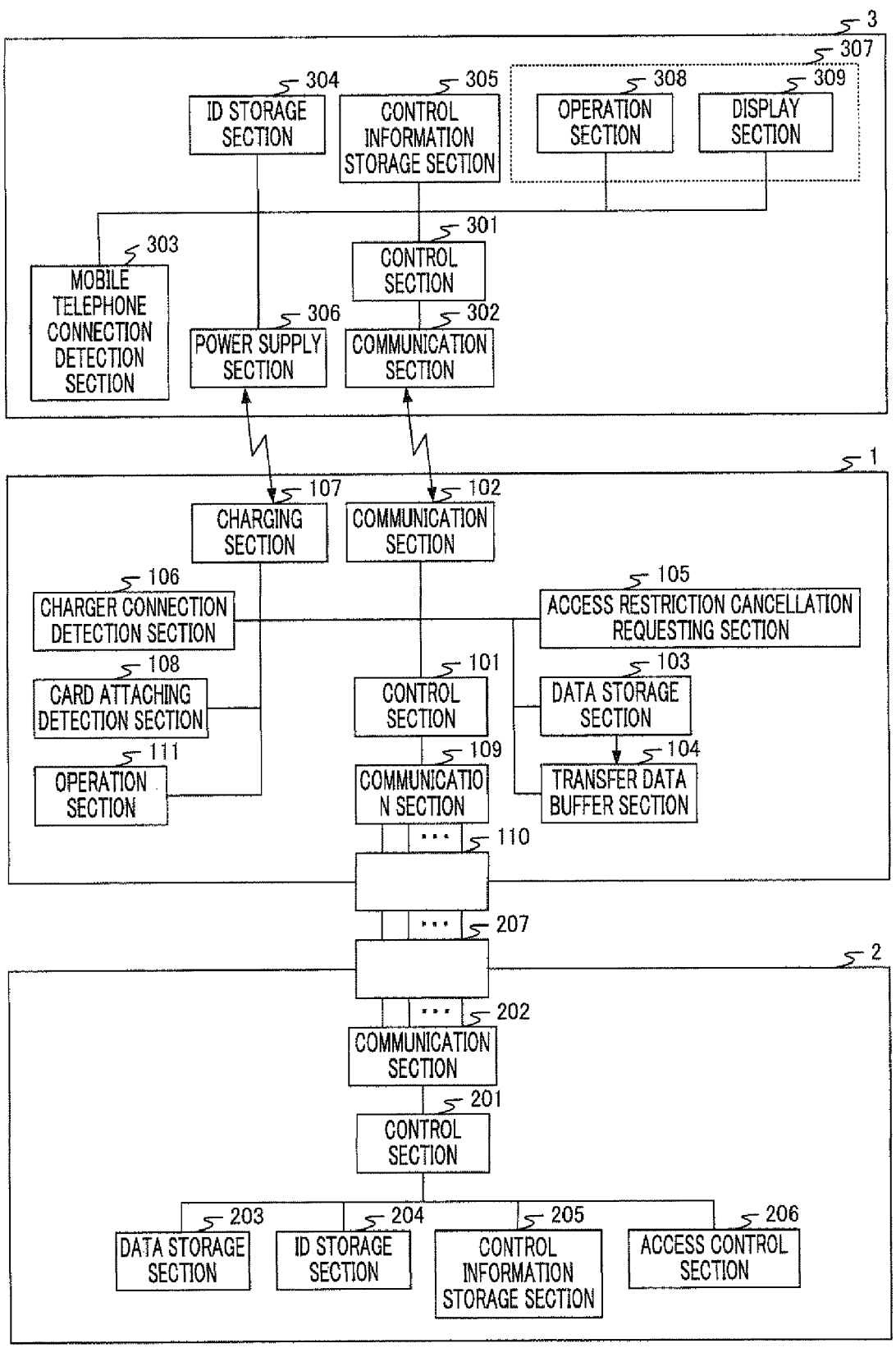
FIG. 2 is a block diagram showing the configuration of each apparatus of the automatic backup system according to Embodiment 1 of the present invention.

FIG. 2 is a block diagram showing the configuration of each apparatus of the automatic backup system according to Embodiment 1 of the present invention. In FIG. 2, mobile telephone 1 has control section 101, communication sections 102 and 109, data storage section 103, transfer data buffer section 104, access restriction cancellation requesting section 105, battery charger connection detection section 106, charging section 107, card attaching detection section 108, connector section 110 and operation section 111.

Control section 101 controls each section of mobile telephone 1. Communication section 102 transmits/receives data to/from battery charger 3. Data storage section 103 stores data necessary for calculation processing carried out by mobile telephone 1, for example, address book data and also stores data obtained as a result of calculation processing. Transfer data buffer section 104 temporarily stores data for backup or restoration in conjunction with data storage section 103. Access restriction cancellation requesting section 105 receives ID data from battery charger 3 and requests memory card with an IC card function 2 to cancel access restriction. When the user places mobile telephone 1 on battery charger 3, battery charger connection detection section 106 detects the connection of battery charger 3. Charging section 107 charges power from battery charger 3 and supplies power to each section of mobile telephone 1. when the user attaches memory card with an IC card function 2 to connector section 110, card attaching detection section 108 detects a current passing through memory card with an IC card function 2 and thereby detects the attachment of memory card with an IC card function 2. Communication section 109 transmits/receives data to/from memory card with an IC card function 2 through connector section 110. Connector section 110 detachably holds memory card with an IC card function 2 and transmits/receives signals between memory card with an IC card function 2 and mobile telephone 1. Furthermore, connector section 110 supplies power from battery charger 3 to memory card with an IC card function 2. Operation section 111 is configured with a numeric keypad or the like and outputs an operation command entered by the user to control section 101.

In FIG. 2, memory card with an IC card function 2 has control section 201, communication section 202, data storage section 203, ID storage section 204, control information storage section 205, access control section 206 and connector section 207.

Control section 201 controls each section of memory card with an IC card function 2. Communication section 202 transmits/receives data to/from mobile telephone 1. Data storage section 203 stores backup data or restoration data. ID storage section 204 stores ID data for access restriction. Control information storage section 205 stores control information. Access control section 206 compares the ID data stored in battery charger 3 with the ID data stored in ID storage section 204 and performs access restriction to/from mobile telephone 1. Connector section 207 is connected to connector section 110 of mobile telephone 1 and transmits/receives signals between communication section 202 and communication section 109 of mobile telephone 1.

In FIG. 2, battery charger 3 has control section 301, communication section 302, mobile telephone connection detection section 303, ID storage section 304, control information storage section 305, power supply section 306 and operation panel section 307. Operation panel section 307 has operation section 308 and display section 309.

Control section 301 controls each section of battery charger 3. Communication section 302 transmits/receives data to/from mobile telephone 1. When the user places mobile telephone 1 on battery charger 3, mobile telephone connection detection section 303 detects the connection of mobile telephone 1. ID storage section 304 prestores ID data to be backed up of memory card with an IC card function 2. If the ID data prestored in ID storage section 304 is correct data, the ID data becomes data for access restriction cancellation of memory card with an IC card function 2. Control information storage section 305 stores specifications necessary for backup or restoration such as the type of data to be backed up, backup/restoration type and backup timing as control information. Examples of the type of data to be backed up include still image, moving picture, address book, email, schedule and all types. Furthermore, examples of backup specifications include "difference backup" and "full backup," and examples of restoration specifications include "overwrite" and "add." Furthermore, examples of backup timing include immediately after the mobile telephone is set in the battery charger and a preset time.

Power supply section 306 supplies power to mobile telephone 1. Operation panel section 307 is placed on the front of battery charger 3 to make it easier for the user to use operation section 308 and display section 309. Operation section 308 outputs an operation command necessary for control section 301 through the user's operation. Display section 309 displays data.

Figure 3:
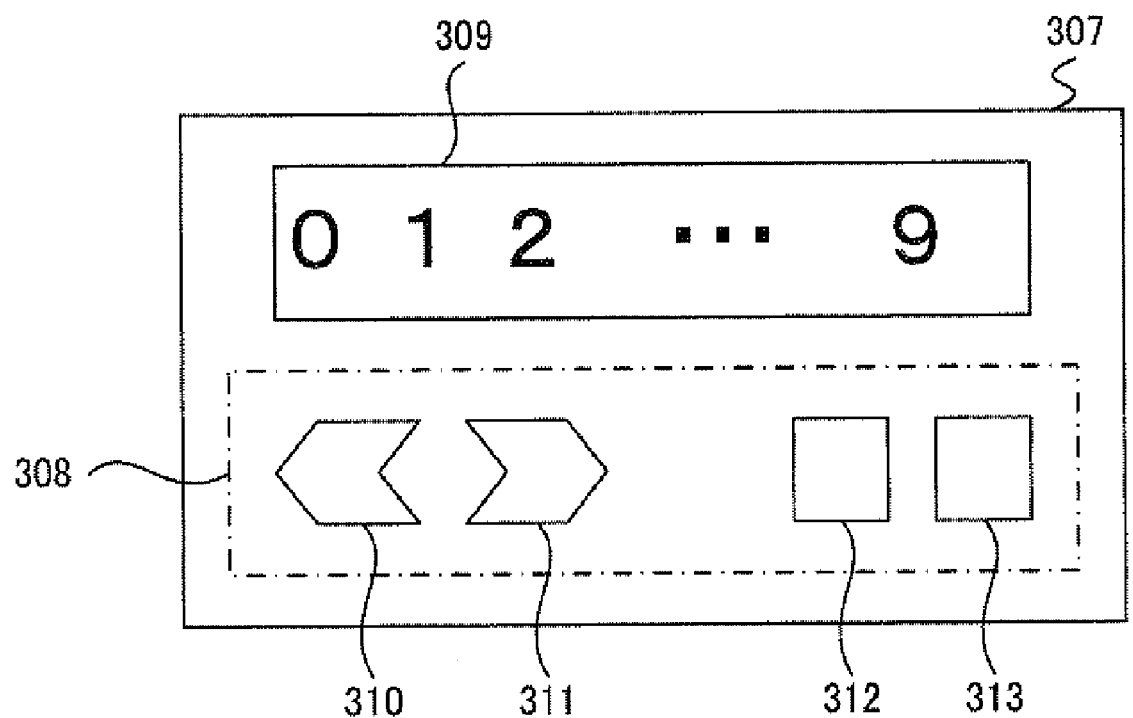
FIG. 3 shows an operation panel section of the battery charger according to Embodiment 1 of the present invention.

FIG. 3 is a schematic view of operation panel section 307 of battery charger 3. Operation section 308 has function changeover switches 310 and 311, selection key 312 and display changeover key 313. Display section 309 is disposed above operation section 308.

Next, a method of storing ID data in ID storage section 304 of battery charger 3 using operation panel section 307, will be described. First, the user operates display changeover key 313 to display numerical values "0" to "9" on display section 309. The user uses function changeover key 310 or 311 to move the cursor, selects any one of the numerical values from "0" to "9" and specifies a first digit of the ID data. When the user presses selection key 312 in this condition, the first digit of the ID data is selected. After entering the second digit to the last digit of the ID data one by one, the user presses selection key 312 for a longer time after entering the last digit than after entering the other digits, and thereby stores the ID data in ID storage section 304.

Next, a method of storing control information in control information storage section 305 will be explained. Although control information can be set in various ways according to the specification of the automatic backup system, "total backup" whereby the user backs up total data of data storage section 103 of mobile telephone I and "partial backup" whereby the user backs up only data in a predetermined range of data storage section 103 of mobile telephone 1, are assumed to be preset as the target data types. When backing up total data, the user uses display changeover key 313 to cause display section 309 to display "total backup" and then presses selection key 312 for a long time and specifies backup of the total data of data storage section 103. In this way, when the user specifies backup of the total data and presses selection key 312 for a long time, control information storage section 305 stores "backup of total data" as control information accordingly.

When the user specifies "partial backup," the user uses display changeover key 313 to cause display section 309 to display "partial backup" and then presses selection key 312 for a long time and specifies backup of partial data of data storage section 103. In this case, the start address and backup capacity of the backup target (area) of data storage section 103 of mobile telephone 1 to be partially backed up are assumed to be predetermined. In this way, when the user specifies backup of partial data and presses selection key 312 for a long time, control information storage section 305 stores the "start address of data storage section 103 to be partially backed up and data capacity to be backed up" as control information accordingly. In order to allow a plurality of areas to be set for addresses to be partially backed up, a plurality of areas to be backed up such as "partial backup area 1" and "partial backup area 2" may be provided beforehand so as to be made selectable by display section 309 and display changeover key 313.

Furthermore, to specify "backup/restoration type" as control information, the user uses display changeover key 313 to display "backup" or "restoration" on display section 309 and then presses selection key 312 for a long time and specifies the type of backup or restoration. In this way, when the user specifies backup or restoration and presses selection key 312 for a long time, control information storage section 305 stores "backup" or "restoration" as control information accordingly.

In this way, the user uses operation panel section 307 of battery charger 3 to store ID data in ID storage section 304, also stores desired control information in control information storage section 305 and sets the specification of the automatic backup system.

Figure 4:
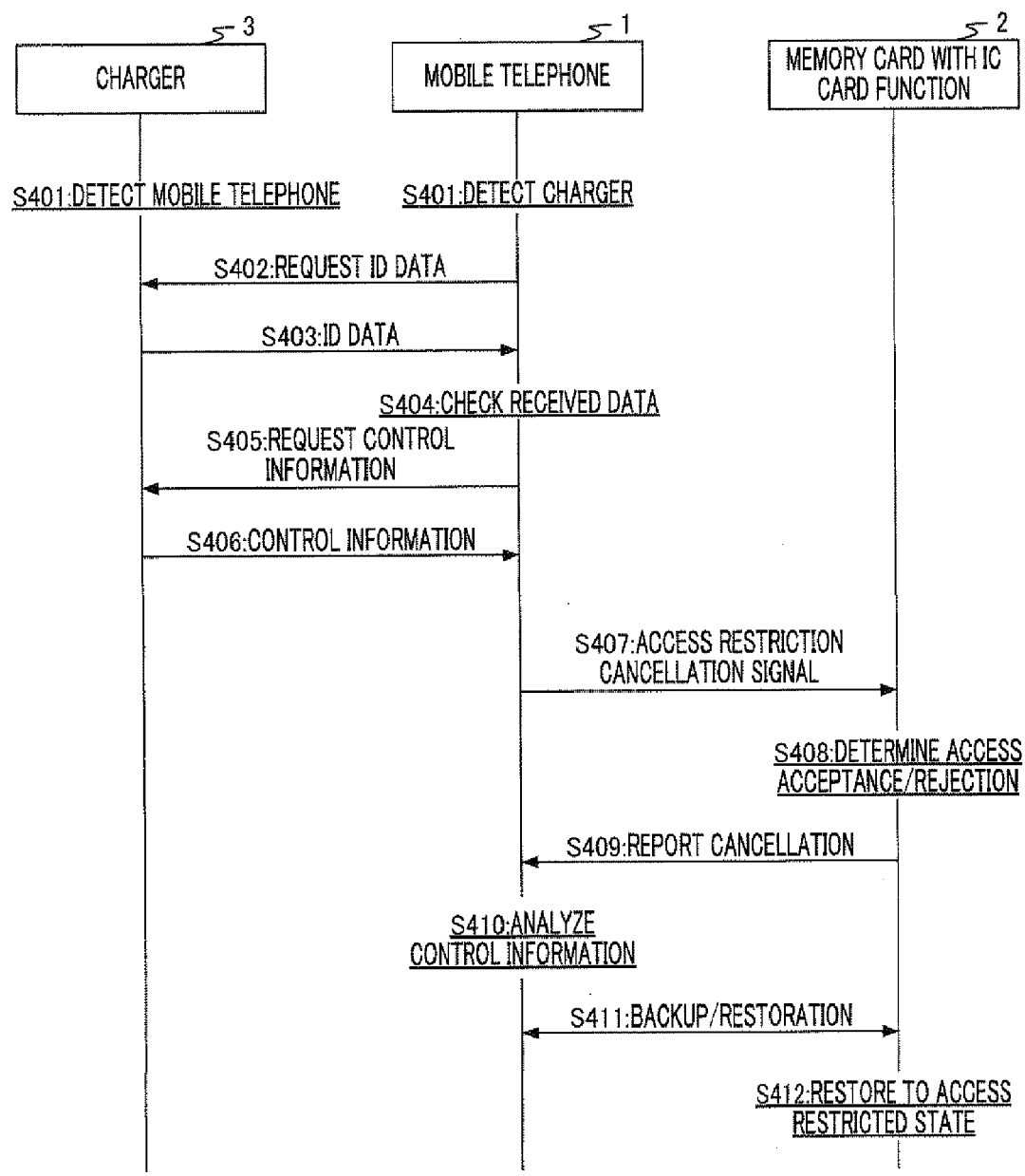
FIG. 4 is a sequence diagram showing the operation of the automatic backup system according to Embodiment 1 of the present invention.

Next, the operation of the automatic backup system according to Embodiment 1 will be explained based on the sequence diagram in FIG. 4. In FIG. 4, suppose the user has already set ID data and control information in battery charger 3.

When the user brings mobile telephone 1 closer to battery charger 3 for charging, a communication path is formed through proximate transmission between communication section 102 of mobile telephone 1 and communication section 302 of battery charger 3. Accompanying the formation of this communication path, battery charger connection detection section 106 of mobile telephone 1 detects the connection of battery charger 3 and mobile telephone connection detection section 303 of battery charger 3 detects mobile telephone 1 (S401). This causes mobile telephone 1 to enter into a state of communicating with battery charger 3. Simultaneously with this, power supply section 306 of battery charger 3 approaches charging section 107 of mobile telephone 1, charging section 107 receives a power supply from power supply section 306 and is charged and supplies the charged power to the respective sections of mobile telephone 1. This allows mobile telephone 1 and memory card with an IC card function 2 to perform a backup operation in an electrically stable condition.

Next, control section 101 of mobile telephone 1 requests battery charger 3 to transmit an ID through communication section 102 (S402). Control section 301 of battery charger 3 transmits the ID data stored in ID storage section 304 to control section 101 of mobile telephone I through transmission section 302 (S403). Control section 101 of mobile telephone 1 outputs the received ID data to access restriction cancellation requesting section 105. Access restriction cancellation requesting section 105 checks authenticity of received data as to whether or not the received ID data is configured in a predetermined format (S404).

Next, when access restriction cancellation requesting section 105 confirms the authenticity of the received data, control section 101 requests battery charger 3 to transmit control information through communication section 102 (S405). Control section 301 of battery charger 3 transmits control information through communication section 302 (S406). This completes preparations for access restriction between mobile telephone 1 and memory card with an IC card function 2.

Next, access restriction cancellation requesting section 105 of mobile telephone 1 transmits an access restriction cancellation request signal including the ID data received in step S403 to memory card with an IC card function 2 through communication section 109 (S407)

Next, access control section 206 of memory card with an IC card function 2 which has received the access restriction cancellation request signal determines whether or not the ID data included in the access restriction cancellation request signal matches the ID data of memory card with an IC card function 2 stored in ID storage section 204 (S08). Upon determining a match, access control section 206 outputs an access restriction cancellation report signal to control section 101 of mobile telephone 1 through communication section 202 and connector section 207 (S409). Accompanying this, memory card with an IC card function 2 cancels access restriction over backup and restoration for mobile telephone 1.

Next, control section 101 of mobile telephone 1 analyzes the control information received in step S406 (S410). Next, when the analysis result of the control information designates backup, control section 101 of mobile telephone 1 temporarily stores partial or total data stored in data storage section 103 in transfer data buffer section 104. Transfer data buffer section 104 then establishes synchronization with memory card with an IC card function 2, outputs the temporarily stored data to data storage section 203 of memory card with an IC card function 2 through communication section 109 and backs up the data (S411). When the control information received in step S406 designates restoration, control section 101 of mobile telephone I temporarily stores the data outputted from memory card with an IC card function 2 in transfer data buffer section 104 and then restores the data in a predetermined area of data storage section 103 (S411). When backup or restoration of the data is completed as described above, memory card with an IC card function 2 is restored to an access restricted state (S412).

In this way, according to the present embodiment, when backup is performed during charging, the access restriction function of memory card with an IC card function 2 is canceled based on the cancellation data of access restriction stored in battery charger 3 and backup or the like of data to the memory card with an IC card function is performed. Thus, memory card with an IC card function 2 has access control section 206, and therefore the memory card is inaccessible to any person other than the user having an access right to enter predetermined ID data, so that it is possible to maintain high security performance.

Furthermore, by applying data backup to memory card with an IC card function 2, it is not necessary to provide battery charger 3 with a memory for data backup. Therefore, even when the capacity of data storage section 103 of the mobile telephone is increased in the future, the cost for data backup of battery charger 3 will not increase.

Although the present embodiment is designed so that data transmission and power transmission are carried out through proximate transmission between mobile telephone 1 and battery charger 3, between communication section 102 and communication section 302, and between charging section 107 and power supply section 306, this is intended to avoid nonconformities such as dust, and, when such nonconformities are not problematic, mobile telephone 1 and battery charger 3 may be connected via the connector section.

Furthermore, although an example have been described with the present embodiment where, when ID data is stored in ID storage section 304 of battery charger 3, the ID data is inputted digit by digit using operation panel section 307, the present invention places no limitation on the method of entering ID data. For example, the embodiment may also be adapted in such a way that ID data of memory card with an IC card function 2 and ID data of battery charger 3 are set to a common default value, memory card with an IC card function 2 and battery charger 3 are sold in pairs, and, when the user who has purchased this inputs new ID data to mobile telephone 1 and then places mobile telephone 1 attached with memory card with an IC card function 2 on battery charger 3, the new ID data is stored in ID storage section 204 of memory card with an IC card function 2 and ID storage section 304 of battery charger 3. By storing ID data using a prestored default value, it is not necessary to provide operation panel section 307 shown in FIG. 3 for setting the ID data.

Furthermore, ID storage section 304 of battery charger 3 may store not only a single piece of ID data but also a plurality of pieces of ID data. This allows a plurality of mobile telephones having ID data that matches any one of the plurality of pieces of ID data stored in battery charger 3 to carry out backup operation. When storing the plurality of pieces of ID data, sufficient measures should be taken to ensure the security such as requiring an entry of preceding ID data already stored prior to a setting of additional ID data. As the technique that requires preceding ID data when ID data is added or changed, publicly known and conventional techniques can be used, and therefore detailed explanations thereof will be omitted. The present invention can also perform access restriction using more sophisticated encryption techniques. For example, secret keys may be stored in battery charger 3 and memory card with an IC card function 2 instead of ID data, challenge-response authentication may be carried out between battery charger 3 and memory card with an IC card function 2 to improve the security. For such an encryption technique, publicly known and conventional techniques can also be used, and therefore detailed explanations thereof will be omitted.

Furthermore, to ensure the security using ID data, it is preferable to increase the number of digits of ID data, use high-level data also including symbols like alphabetic characters or the like and change the ID data at predetermined time intervals. It is a great burden for the user to set this high-level data using only operation panel section 307 of Embodiment 1. On the other hand, the information communication terminal apparatus such as a mobile telephone has a keyboard device with a variety of functions, and therefore the user of the mobile telephone can easily configure new ID data in a high-level data configuration. Therefore, it is also possible to use simple data with a small number of original digits as the ID data to be set by battery charger 3 singly and allow the ID data to be updated with this simple ID data so that high-level data created later by mobile telephone 1 is used as the ID data. By using such a technique of updating ID data, it is not necessary to provide operation panel section 307 or the like for setting ID data in battery charger 3, and it is only necessary to adopt a simple configuration for storing the original ID data, so that it is possible to realize battery charger 3 at lower cost. Furthermore, by describing control information in the mobile telephone beforehand using a user interface, it is not necessary to provide battery charger 3 with operation panel section 307 or the like for setting control information.

Embodiment 2

Figure 5:
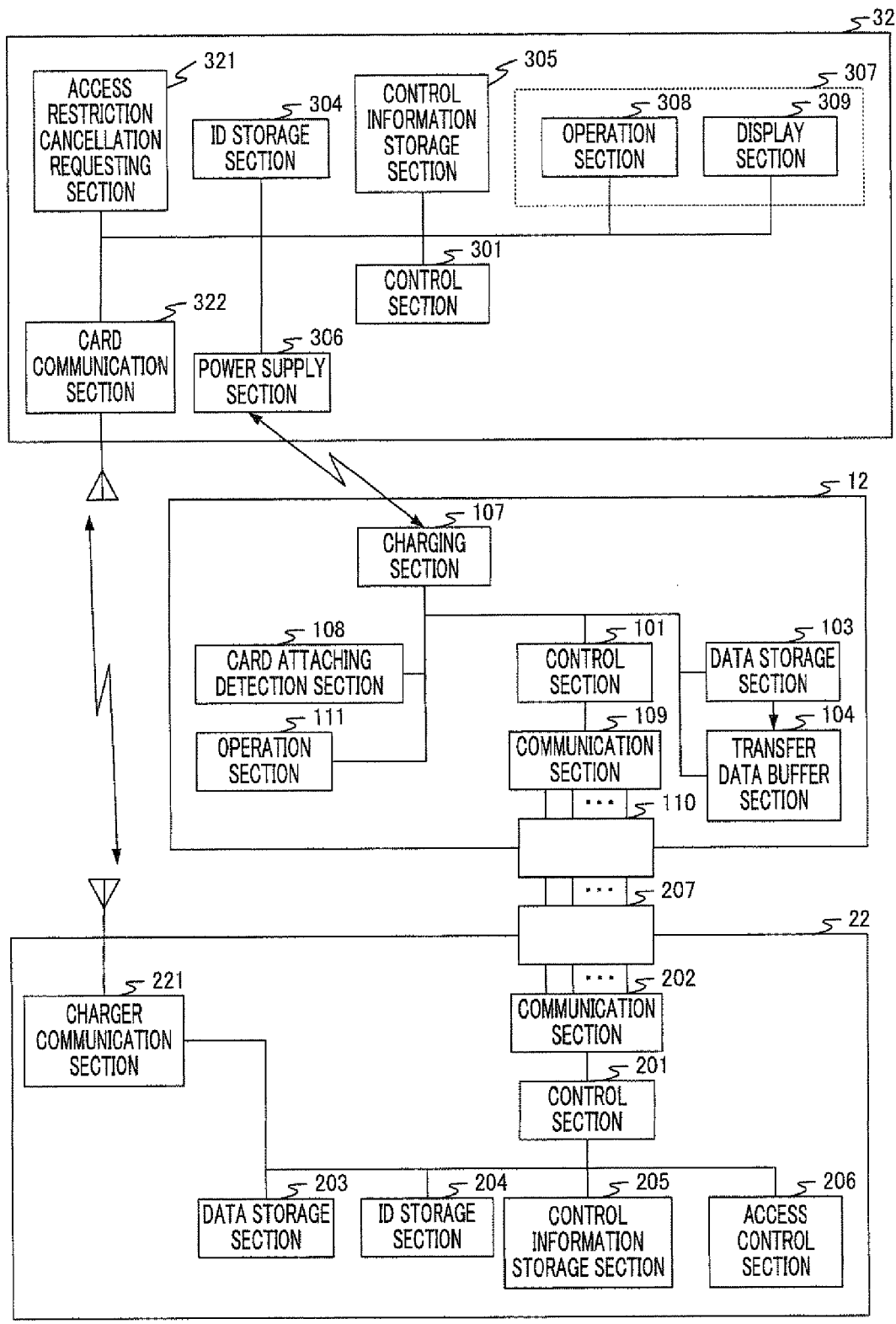
FIG. 5 is a block diagram showing the configuration of each apparatus of an automatic backup system according to Embodiment 2 of the present invention.

FIG. 5 is a block diagram showing the configuration of each apparatus of an automatic backup system according to Embodiment 2 of the present invention. Blocks in FIG. 5 common to those in FIG. 2 will be assigned the same reference numerals as those in FIG. 2 and detailed explanations thereof will be omitted. The automatic backup system according to Embodiment 2 has memory card with an IC card function 22, which is of a non-contact type card, and memory card with an IC card function 22 is characterized by directly receiving ID data from battery charger 32 and carrying out access control.

In FIG. 5, compared to mobile telephone 1 in FIG. 2, mobile telephone 12 does not include communication section 102, access restriction cancellation requesting section 105 and battery charger connection detection section 106. Likewise, compared to battery charger 2 in FIG. 2, battery charger 32 does not include communication section 302 and mobile telephone connection detection section 303 either, because mobile telephone 12 and battery charger 32 need not directly communicate with each other in the present embodiment.

In FIG. 5, compared to memory card with an IC card function 2 in FIG. 2, memory card with an IC card function 22 adopts a configuration of adding battery charger communication section 221. Battery charger communication section 221 has an antenna and communicates with battery charger 32 in a non-contact manner while being attached to mobile telephone 12 when mobile telephone 12 approaches battery charger 32.

In FIG. 5, compared to battery charger 3 in FIG. 2, battery charger 32 adopts a configuration of adding access restriction cancellation requesting section 321 that requests memory card with an IC card function 22 to cancel access restriction and card communication section 322 that communicates with memory card with an IC card function 22. Access restriction cancellation requesting section 321 of mobile telephone 1 transmits an access restriction cancellation request signal including ID data stored in the ID storage section to memory card with an IC card function 22 through card communication section 322. Card communication section 322 has an antenna and transmits an access restriction cancellation request signal and control information when memory card with an IC card function 22 approaches.

Figure 6:
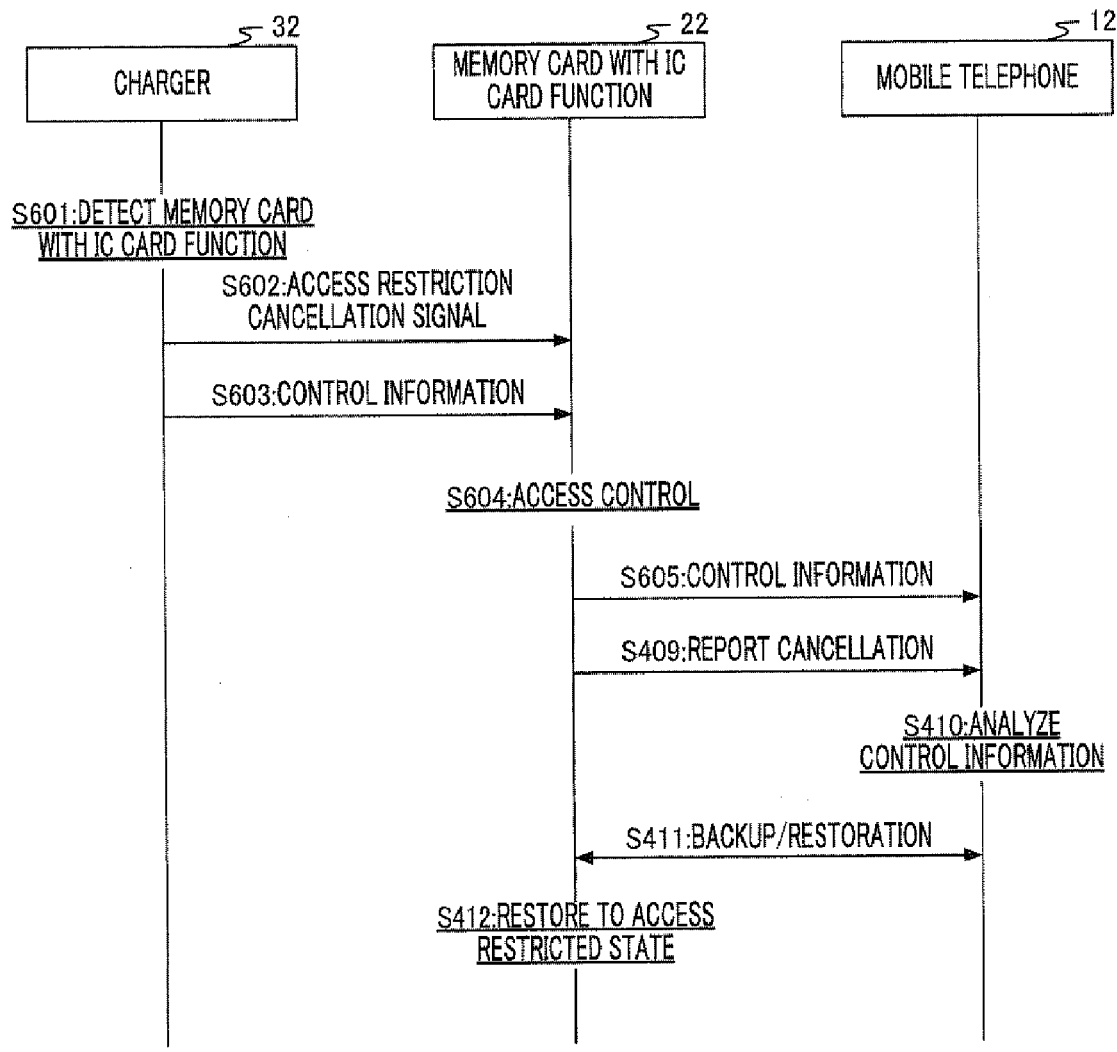
FIG. 6 is a sequence diagram showing the operation of the automatic backup system according to Embodiment 2 of the present invention.

Next, the operation of the automatic backup system according to Embodiment 2 will be explained based on the sequence diagram in FIG. 6. In FIG. 6, steps common to those in FIG. 4 will be assigned the same reference numerals as those in FIG. 4 and detailed explanations thereof will be omitted.

When the user brings mobile telephone 12 closer to battery charger 32 for charging, a communication path is formed between battery charger communication section 221 of non-contact memory card with an IC card function 22, and card communication section 322 of battery charger 32 and battery charger 32 detects non-contact memory card with an IC card function 22 (S601).

Next, access restriction cancellation requesting section 321 of battery charger 32 reads ID data from ID storage section 304 and transmits an access restriction cancellation request signal including this ID data to memory card with an IC card function 22 (S602).

Next, control section 301 of battery charger 32 reads control information from control information storage section 305 and transmits this control information to memory card with an IC card function 22 (S603). Control information storage section 205 of memory card with an IC card function 22 stores the control information transmitted from battery charger 32.

Next, access control section 206 of memory card With an IC card function 22 compares the ID data transmitted From battery charger 32 with the ID data of mobile telephone 12 stored in ID storage section 204 and cancels access restriction when the IDs match (S604). When the IDs do not match, access restriction is not canceled.

Next, when access restriction is canceled, memory card with an IC card function 22 transmits the control information stored in control information storage section 205 to mobile telephone 12 (S605). This causes mobile telephone 12 to complete preparations for backup or restoration.

Next, when memory card with an IC card function 22 reports cancellation of access restriction to mobile telephone 12, steps S409 to S412 shown in FIG. 2 are carried out hereafter, and backup or restoration is performed between mobile telephone 12 and memory card with an IC card function 22.

As described above, according to the automatic backup system according to Embodiment 2, memory card with an IC card function 22 is a non-contact-type card with a built-in antenna, and therefore, when an access restriction function using the memory card with an IC card function is incorporated in the mobile telephone, it is possible to minimize changes for remodeling the body of the mobile telephone, manufacture the body of the mobile telephone at lower cost and also increase flexibility when updating the access restriction function.

INDUSTRIAL APPLICABILITY

The present invention is suitable for use in an information communication terminal apparatus that backs up data during charging.

The invention claimed is:
1. An information holding device comprising:
an access control section configured to authenticate a battery charger, and cancels access restriction when the battery charger is authenticated; and
a control section configured to control backup or restoration between the terminal apparatus and the information holding device when the access restriction is canceled, wherein the information holding device is configured to be accommodated in the terminal apparatus.

2. A terminal apparatus comprising:
a charging section configured to receive power supplied from a battery charger;
a connector configured to accommodate an information holding device therein; and
a control section configured to control backup or restoration between the information holding device and the terminal apparatus when the information holding device cancels access restriction after authentication of the battery charger performed by the information holding device.

3. An automatic backup system comprising:
a terminal apparatus;
an information holding device configured to control backup or restoration between the terminal apparatus and the information holding device when access restriction is canceled; and
a battery charger configured to supply power to the terminal apparatus, wherein
the terminal apparatus is further configured to accommodate the information holding device therein;
the information holding device is further configured to authenticate the battery charger, and cancel the access restriction when the battery charger is authenticated.

4. The information holding device according to claim 1, further comprising:
a connector configured to detachably connect to a terminal apparatus regardless of whether or not the terminal apparatus is connecting to a battery charger which supplies power to the terminal apparatus.

5. The information holding device according to claim 1, further comprising:
a communication section configured to receive information required for authenticating the battery charger from the battery charger through the terminal apparatus, wherein
the access control section is configured to authenticate the battery charger by using the received information.

6. The information holding device according to claim 1, further comprising:
a communication section configured to receive information required for authenticating the battery charger directly from the battery charger, wherein
the access control section is configured to authenticate the battery charger by using the received information.

7. The terminal apparatus according to claim 2, wherein
the connector is further configured to detachably connect to the information holding device regardless of whether or not the terminal apparatus is connecting to a battery charger which supplies power to the terminal apparatus.

8. The terminal apparatus according to claim 2, further comprising,
a communication section configured to receive, from the battery charger, information required for authenticating the battery charger when the battery charger connects to the terminal apparatus; and forwards the received information to the information holding device.

* * * * *